United States Patent [19]

Yokoi et al.

[11] Patent Number: 5,220,552
[45] Date of Patent: Jun. 15, 1993

[54] DISC APPARATUS WITH A GUIDE FOR DISK INSERTION

[75] Inventors: Chikazu Yokoi, Odawara; Masayuki Tamasaku, Kanazawa; Masaru Yokoyama, Higashimurayama; Shunji Fujimori, Kodaira, all of Japan

[73] Assignee: Hitachi, Ltd., Tokyo, Japan

[21] Appl. No.: 745,441

[22] Filed: Aug. 15, 1991

[30] Foreign Application Priority Data

Aug. 16, 1990 [JP] Japan .................. 2-215010

[51] Int. Cl.⁵ ............................. G11B 17/04
[52] U.S. Cl. .................. 369/77.2; 369/77.1; 360/99.02; 360/99.06
[58] Field of Search ............ 369/77.2, 77.1; 360/99.02, 99.06

[56] References Cited

U.S. PATENT DOCUMENTS 3,940,793 2/1976 Bleiman .................. 369/77.2
4,142,730 3/1979 Hynd et al. .............. 360/99.02
4,691,257 9/1987 Taguchi .................. 369/7.2

FOREIGN PATENT DOCUMENTS 63-58374 4/1988 Japan .

Primary Examiner—Jack I. Berman
Attorney, Agent, or Firm—Fay, Sharpe, Beall, Fagan, Minnich & McKee

[57] ABSTRACT

A disc apparatus includes a surface having a slot used for inserting therethrough a disc and a guide mounted to the surface so as to be rotatable up to a position substantially perpendicular to the surface, the guide having a face on the substantial same level as that of an edge of the slot, the face having dimensions enough to cover the slot. A plurality of grooves or a brush extending longitudinally with respect to the slot may be provided on the guide. A projection is projected in a direction substantially perpendicular to both one edge of the slot and the surface of the apparatus. The projection serves to make the positioning when inserting the disc easy. A magnetic substance and a magnet are respectively mounted to positions of the guide and the surface of the apparatus corresponding to each other. The magnetic substance and the magnet serve to bring the guide into contact with the apparatus and thus are effective for preventing the dust from entering into the apparatus.

12 Claims, 4 Drawing Sheets

DISC APPARATUS WITH A GUIDE FOR DISK INSERTION

BACKGROUND OF THE INVENTION

The present invention relates to a disc apparatus and more particularly to improvements in a disc apparatus, such as a video disc apparatus and a floppy disc apparatus, for handling a disc mounted in a cartridge.

For example, in an optical disc apparatus, a disc is mounted in a cartridge, when the cartridge is pushed in a slot provided in a disc apparatus body, a dust protective door of the slot is opened so that the cartridge is loaded in a predetermined position, where the reproducing and the recording are performed, by a mechanism provided inside the disc apparatus body. At this time, a shutter of the cartridge is opened and the disc is set to a spindle motor. Thus, the recording/reproducing is performed. Thereafter, when an operator pushes an eject button provided outside the body of the disc apparatus after the completion of the recording/reproducing operation, the cartridge is unloaded and its shutter is closed. Then, the cartridge is transferred in a direction of being discharged towards the slot, to be ejected from the slot. Such an apparatus is, for example, described in JP-A-63-58374 (U) (the term "U" used herein means that the utility model application was laid open to public inspection but has not been examined).

With such a disc apparatus, in inserting the cartridge, the cartridge must be straightly inserted into the slot. In other words, after making the distal end of the cartridge correspond in position to the slot correctly, the cartridge must be straightly pushed in a direction perpendicular to the surface of the slot. However, since the cartridge must be correctly introduced into the loading mechanism provided inside the disc apparatus body, a gap between the slot and the cartridge is considerably small. Therefore, it is impossible to perform the insertion operation at one time. For example, the cartridge having an optical disc of 30 cm size mounted therein is heavy and large, and therefore, it requires considerable labor to insert that cartridge.

SUMMARY OF THE INVENTION

It is therefore an object of the present invention to provide a disc apparatus in which even in the case of a relatively large cartridge, the operation of inserting the cartridge into the apparatus is performed easily and rapidly.

It is another object of the present invention to provide a disc apparatus in which with a distal end of a cartridge being supported by a guide, the positioning between a slot and the cartridge is performed by holding the side of the cartridge.

It is still another object of the present invention to provide a disc apparatus which is capable of preventing the dust from entering into the inside of the disc apparatus.

A disc apparatus according to the present invention comprises a guide disposed so as to lie on the substantial same plane as that of a lower member constituting a slot used for inserting therethrough a cartridge, said guide serving to guide the insertion of said cartridge into said slot and being pivoted to close said slot.

The insertion of the cartridge is performed in such a way that the distal end of the cartridge is put on the guide with the guide being located in the former position, i.e., in a state in which the guide lies on the same plane as that of the lower member constituting the slot, and the cartridge is then pushed towards the slot. At this time, since the distal end of the cartridge is supported by the guide, the cartridge is made to correspond in position to the slot by only being slidden in the insertion direction on the guide, and it is introduced into the slot while being guided by the guide by being pushed directly.

DESCRIPTION OF THE PREFERRED EMBODIMENTS

Preferred embodiments of a disc apparatus according to the present invention will hereinafter be described in detail with reference to the accompanying drawings.

Figure 1A:
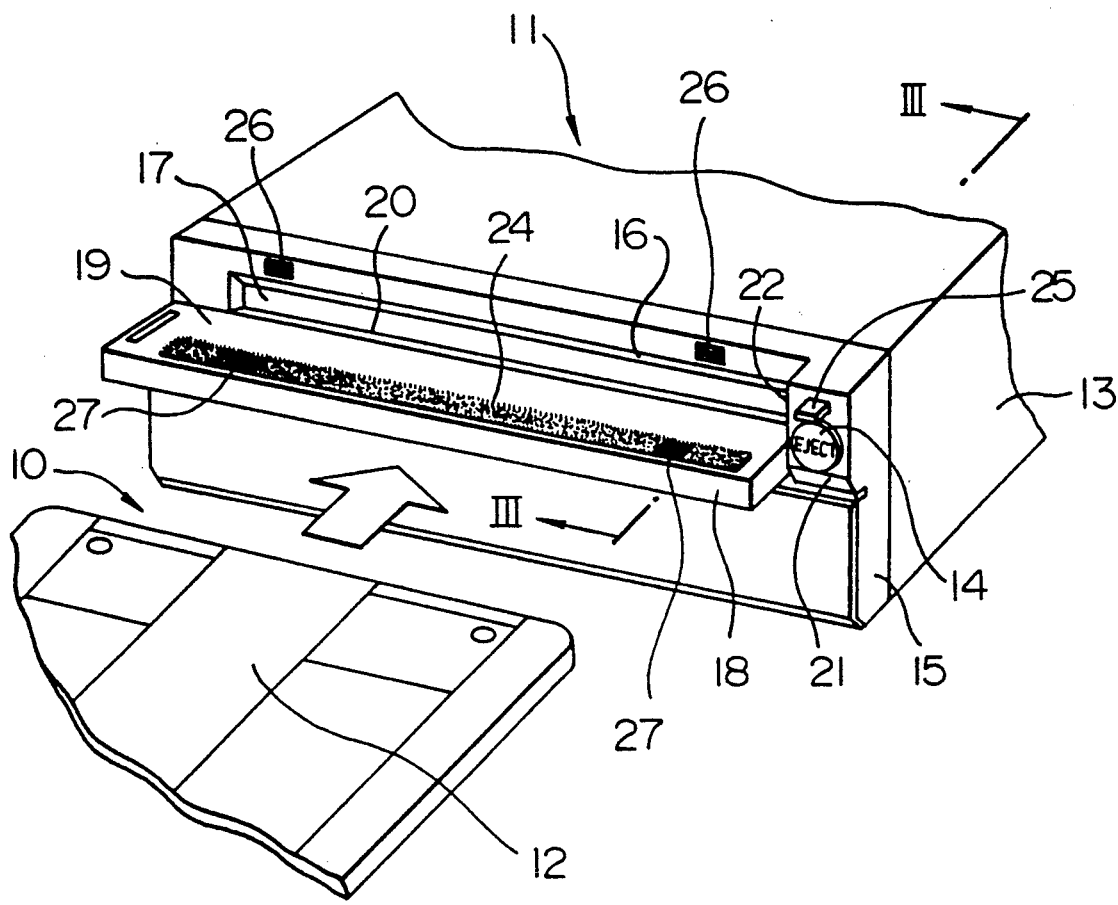
FIG. 1A is a perspective view showing a part of a cartridge and a front portion of a disc apparatus body in a first embodiment of a disc apparatus according to the present invention.

The disc apparatus according to a first embodiment includes a cartridge 10 and a disc apparatus body 11, as shown in FIG. 1A. The cartridge 10 is well known in itself. The cartridge 10 has an optical disc mounted therein and includes an opening for exposing a part of the disc and a shutter 12 for closing the opening.

The disc apparatus body 11 includes a casing 13. The casing is formed in the form of hollow box type. In the casing are incorporated a reproducing unit including an optical head, a loading mechanism for moving the cartridge 10 to a reproducing position, and the like. Push buttons provided in a front panel 15 serve to actuate these mechanisms, respectively.

The front panel 15 constituting the casing 13 is provided with a slot 16 through which the cartridge is inserted. The slot has the size relating to the width and thickness of the cartridge 10 and is always closed by a dust protective door 17 provided inside the casing. The dust protective door 17 is disposed inside the slot 16 and is mounted to an upper wall surface constituting the slot 16 by hinges.

In the disc apparatus according to the first embodiment of the present invention, a guide 18 is fixed to the front panel 15. The guide 18 is disposed outside of this side of the front panel 15 and the lower edge of the guide 18 thus shown which is located in an inner and disappearing position is fixed to the front panel 15 by hinges. In this connection, the guide 18 is constructed in such a way that its pivotal movement between a position perpendicular to the surface of the front panel shown in the figure and a position covering the slot can be performed around the hinges of the lower edge, and when the guide is pivoted up to the former position, its upper surface 19 lies on the same plane as that of the surface of a lower member 20 constituting the slot 16. Further, the guide 18 has a size enough to cover the total breadth of the slot extending horizontally in Fig. 1A. Thus when the guide 18 is pivoted up to the latter position, i.e., the position overlapping the slot 16, it covers the slot.

The insertion operation of the cartridge 10 is performed in such a way that after the guide 18 is horizontally opened by pushing an open button 25 to make the distal end of the cartridge 10 on the guide 18 correspond in position to the slot 16, the cartridge 10 is straightly pushed towards the inside of the disc apparatus body 11. At this time, in the disc apparatus according to the present embodiment, the positioning between the cartridge 10 and the slot 16 can be performed by only putting the distal end of the cartridge 10 on the guide 18 to slide the cartridge 10 on the guide. Therefore, it is possible to perform the operation of inserting the cartridge through the slot 16 simply and rapidly. After the cartridge 10 is inserted into the inside of the disc apparatus 11, when this side of the guide 18 is lightly pushed up by a finger of an operator to close the guide, a small iron plate 27 embedded in the face of the guide 18 are attracted by magnets 26 embedded in the upper side of the front panel 15, respectively. Thus, the slot 16 is sealed with the dust protective door 17 and the guide 18. Therefore, the less dust enters into the inside of the disc apparatus body, so that it is possible to realize a highly reliable apparatus. Since the guide, i.e., the cover means is in face-contact with the surface of the apparatus over a predetermined area so as to effectively prevent the entrance of the dust, it has a larger area than that of the slot.

Figure 2:
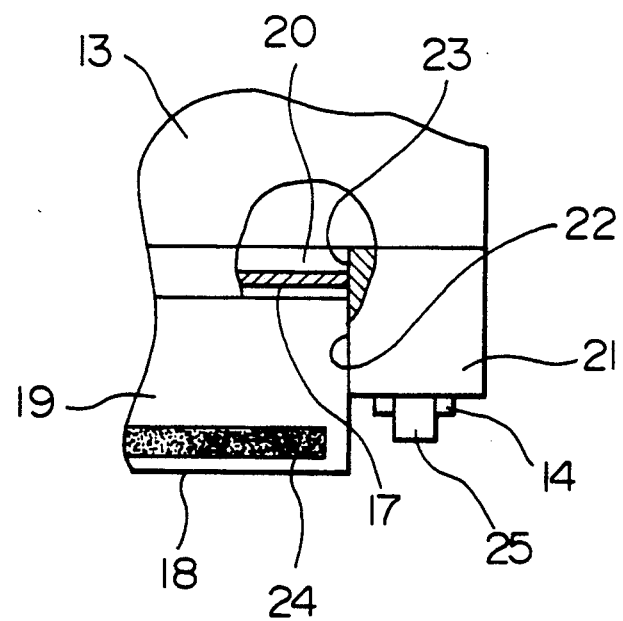
FIG. 2 is an enlarged plan sectional view showing the disc apparatus body with the right-hand side thereof being partially broken away.

FIG. 2 shows a projection 21 provided in a portion relating to one of the edges of the slot 16 in the front panel 15 to make the positioning between the cartridge 10 and the slot 16 easier. The projection 21 is constructed in such a way that its surface 22 on the side of the slot lies on the same plane as that of a right-hand end wall 23 constituting the slot 16. Thus, in performing the positioning between the cartridge 10 and the slot 16, the positioning therebetween can be automatically performed by bringing a right-hand end face of the distal end of the cartridge 10 into contact with the surface 22 of the projection.

Figure 1B:
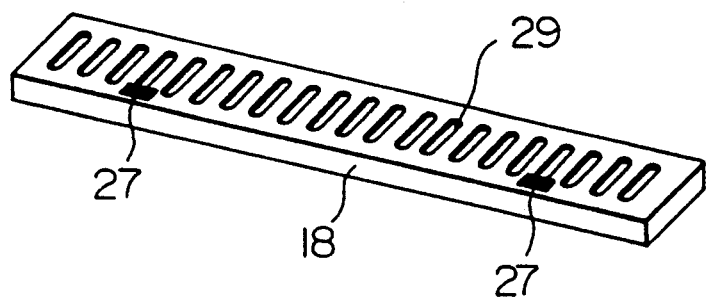
FIG. 1B is a perspective view showing a guide of a modification of the first embodiment of the disc apparatus according to the present invention.

In the disc apparatus, a brush 24 may be provided in the surface of the guide 18 in contact with the cartridge 10, i.e., the surface 19 which forms the same plane together with the lower wall face of the slot when the guide 18 is opened. In this case, when the cartridge 10 is put on the guide and is pushed in the slot 16, the dust which was attracted to the lower face of the cartridge 10 by the static electricity or the like is effectively removed. Thus, a double sealing structure is provided by both the dust protective door 17 and the guide 18 so that dust is surely prevented from entering into the inside of the disc apparatus body. In the guide 18 according to a modification of the first embodiment shown in FIG. 1B, instead of the brush 24, shallow grooves 29 are provided so as to extend along a direction of the length of the guide from this side.

Figure 3:
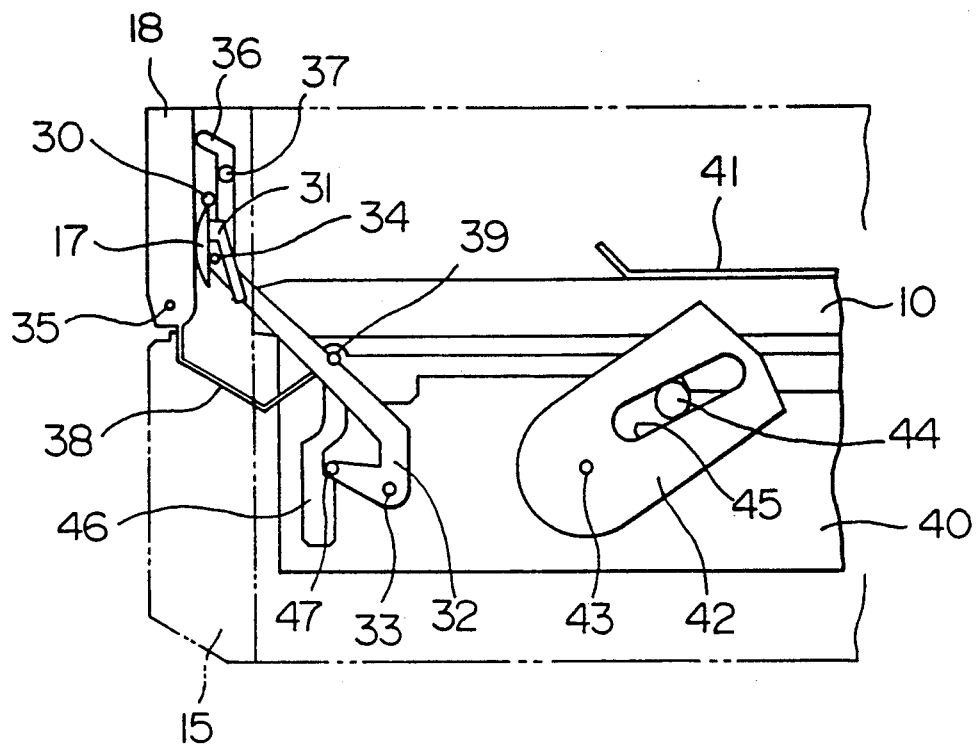
FIG. 3 is a cross sectional view taken substantially along the line III—III of FIG. 1A useful in explaining the arrangement of an internal mechanism.
Figure 4:
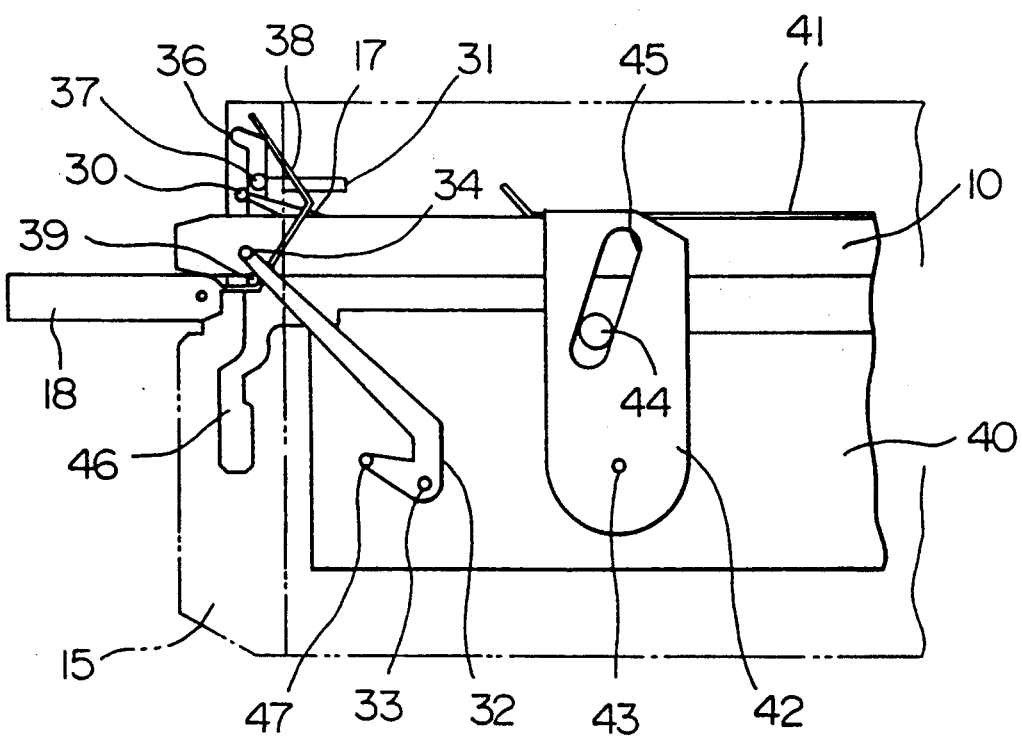
FIG. 4 is a cross sectional view useful in explaining the arrangement of the internal mechanism in a state different from that shown in FIG. 3.

In the present disc apparatus, generally, the magnets embedded in the front panel 15 attract, the respective magnetic substances fixed to the guide 18 to perform the lock of the guide. Instead thereof, however, with respect to the lock of the guide, various known mechanisms may be employed. The releasing operation (described later) is performed by pushing the button 25 provided in the front panel. FIG. 3 and FIG. 4 show the details of the mechanism for releasing the guide.

The dust protective door 17 is, as shown in FIG. 3, fixed to the front panel 15 through the hinges and is pivotable around a pin 30 of each hinge. An L-shaped member 31 is mounted to the rear face of the dust protective door. On the other hand, in the casing is provided a bell crank 32 which is mounted to the frame 40 so as to be rotatable around a pin 33. To one end of the bell crank 32 is mounted a roller 34 which is inserted in a space or a groove defined between the dust protective door 17 and the L-shaped member 31. In this connection, when the bell crank 32 is rotated clockwise, the dust protective door 17 is pivoted counterclockwise to expose the slot 16, while when the bell crank 32 is rotated counterclockwise, the dust protective door 17 is pivoted clockwise to cover the slot 16. Incidentally, the end portion of that this groove is open so that when the bell crank 32 is further rotated clockwise, or when the dust protective door 17 is pivoted counterclockwise, the roller 34 is slipped from the groove, while the bell crank 32 is rotated counterclockwise, the roller 34 is again fitted in the groove.

The guide 18 is mounted to the front panel 15 in such a way as to be pivotable around a pin 35 of the hinge. An arm 36 serves to open and close the guide 18 and is mounted to the front panel 15 so as to be rotatable around a pin 37. The upper end and the lower end of the arm 37 are in contact with the rear face of the guide 18 and the button 25 shown in Fig. 1A, respectively. When the button 25 is pushed, the arm is rotated counterclockwise to push the guide 18 by its upper end. Thus, the guide 18 can be opened against the attraction of the magnets. Although not shown in the figures, since the open groove of the lower end of the arm 36 is engaged with a roller 34 of the bell crank 32 in the same manner as in the dust protective door 17, when the bell crank 32 is rotated clockwise, the arm 36 is rotated counterclockwise. Thus, the guide 18 can be opened together with the dust protective door 17. Moreover, when the bell crank 32 is further rotated clockwise, the roller 34 can be slipped from the groove of the arm 36. Further, to the lower end of the guide 18 is fixed a member 38 made of piano wire or the like. A roller 39 is in contact with that member. When the roller 39 is located in a position where it is in contact with a free end of the member 38 as shown in the figures, even if the arm 36 is rotated, the roller serves to leave the guide 18 being closed. When the roller leaves the member 38, the guide 18 can be opened by the rotation of the arm 36.

The rotation of the bell crank 32 and the movement of the roller 39 are performed in conjunction with the motion of a tray 41 and a slider 46.

The tray 41 serves to hold the cartridge 10 which is inserted into the casing. The tray 41 includes therein a space which is arranged so as to define a gap relating to the thickness of the cartridge 10. The tray 41 is held by the frame 40 so as to be capable of moving horizontally and vertically to move between the loading position shown in FIG. 3 and the unloading position where the distal end of the cartridge corresponds in position to the slot 16. As arm 42 serves to make the tray 41 perform the vertical movement and the horizontal movement. The arm 42 is mounted to the frame 40 so as to be rotated around a pin 43. A roller 44 provided on the side of the tray 41 is engaged with a longitudinal hole 45 provided in the arm 42. The arm 42 is rotated counterclockwise to make the tray 41 move between the above-mentioned two positions.

The slider 46 is disposed below the lower face of the tray 41 and is held by the frame 40 so as to perform the horizontal movement and the vertical movement in the same manner as in the tray. Moreover, the slider 46 is engaged with the roller 44 of the tray 41 so that when the tray 41 is moved by the arm 42, the slider can be moved together therewith. The roller 39 which is in contact with the member 38 extending from the guide 18 is supported by that slider. Moreover, in a portion of the slider 46 extending from the left-hand end to the lower side, a cam is provided. Another roller 47 in the bell crank 32 is in contact with the cam. The cam acts in such a way that when the slider 46 is moved upward together with the tray 41, the bell crank 32 is made rotate clockwise to open the dust protective door 17, and the arm 36 is made rotate counterclockwise to open the guide 18, while when the slider 46 is returned to the position where it was, the bell crank 32 is made rotate counterclockwise to close both the dust protective door 17 and the guide 18.

In an initial state of this mechanism, i.e., in a state in which no insertion of the cartridge 10 has been performed, the arm 42 is located in a position which is determined by further rotating the arm 42 counterclockwise from the position shown in FIG. 4. At this time, the distal end of the tray 41 corresponds in position to the slot 16 and is located in the vicinity thereof.

The loading of the cartridge 10 is started by pushing the button 25. When the button 25 is pushed, the arm 36 is rotated counterclockwise while being released from the roller 34 of the bell crank 32. Then, the upper end of the arm 36 makes the guide 18 pivot counterclockwise to separate the magnets 26 and the small iron plates 27 from each other, thus exposing one side of the slot 16. A spring (not shown) may be mounted between the guide 18 and the front panel 15 to relieve the speed of the pivotal movement of the guide 18 to the horizontal position due to the dead weight of the guide 18.

The cartridge 10 supported by an operator is, under this condition, inserted into the tray 41 through the slot 16 while pushing the dust protective door 17. At this time, the roller 34 of the bell crank 32 is slipped from the groove between the dust protective door 17 and the member 31 to make the dust protective door 17 pivot freely. When the insertion of the cartridge 10 is performed, a tray drive unit (not shown) is actuated, the arm 42 is rotated clockwise by the drive unit. The tray 41 is moved together with the slider 46 in a right-hand direction, and the cartridge 10 is started to be led in the inside of the casing. This state is shown in FIG. 4. Since the arm 42 is continued to be rotated, the tray 41 and the slider 46 are moved up to the position shown in FIG. 3 in a right-hand direction while being moved downward. As a result, a central hole of the disc in the cartridge will be engaged with a spindle provided in the reproducing unit.

After the cartridge 10 is led in the inside of the casing 13, the dust protective door 17 is returned to the position covering the slot 16 by its dead weight and mates again with the bell crank 32. When the slider 46 is moved togerth with the tray 41 up to the position shown in FIG. 3, the roller 47 is brought into contact with the cam provided in the slider 46 to block the rotation of the bell crank 32 to lock the dust protective door 17. At the same time, the roller 39 of the slider 46 is moved from the fixed end of the member 38 towards the free end thereof while being in contact with the member 38, thereby to make the guide pivot towards the slot 16. When the guide 18 reaches the position covering the slot, the magnetic substances embedded in the guide 18 are attracted by the magnets of the front panel 15 to lock the guide 18.

The unloading of the cartridge 10 is performed by pushing the button 14. When the button 14 is pushed, the tray drive unit is actuated, the arm 42 is rotated counterclockwise by that drive unit, the tray 41 and the slider 46 are moved in a left-hand direction while being moved upward, and the cartridge 10 is transferred towards the slot 16. When the slider 46 is moved upward, the bell crank 32 is rotated counterclockwise by the cam on the slider to make the dust protective door 17 pivot counterclockwise, thereby to release the slot 16. At the same time, the arm 36 is rotated counterclockwise by the bell crank 32 to push out the guide 18 counterclockwise against the attraction of the magnets. Moreover, the roller 39 of the slider 46 leaves the member 38 extending from the guide 18 by the upward movement of the slider 46 to make the guide 18 free to provide a state in which the guide 18 can be further pivoted counterclockwise by its dead weight. Thus, the slot 16 is released. The cartridge 10 is pushed to the outside through the slot 16 thus released. This state is shown in FIG. 4. The arm 42 is further rotated counterclockwise from the state of FIG. 4 to move the tray 41 horizontally in a left-hand direction until the distal end of the tray 41 is located in the vicinity of the slot 16. Thus, the cartridge 10 is pushed out while sliding on the surface of the guide 18, until its distal end is projected from the free end of the guid 18. When the operator pulls out the cartridge 10 from the apparatus body, the dust protective door 17 is pivoted counterclockwise by its dead weight to cover the slot 16 and to be engaged with the bell crank 32 again. When the operator makes the guide 18 pivot towards the slot 16, the magnetic substances embeded in the guide 18 is attracted by the magnets of the front panel 15 to lock the guide.

Figure 5:
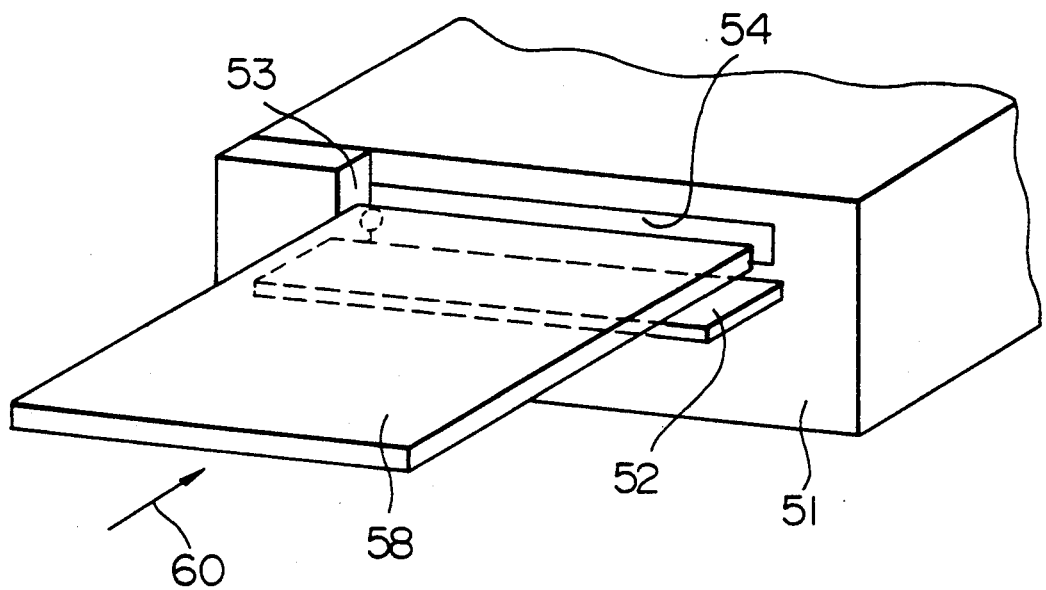
FIG. 5 is a perspective view showing a floppy disc and a front portion of a floppy disc apparatus body in a second embodiment of the disc apparatus according to the present invention.

FIG. 5 is a perspective view showing a floppy disc apparatus of a second embodiment of the disc apparatus according to the present invention.

In a left-hand side face 51 of the apparatus, a guide 52 which is mounted by a hinge and is opened horizontally by its dead weight is provided so as to have the same level in height as that of a lower edge of a slot 54. When a floppy disc 58 with a cartridge is pushed in the apparatus in a direction of an arrow 60 from the position A of FIG. 6A to reach the position B, it is dropped in a direction of an arrow 61 by its dead weight thereby to make the guide 52 pivot in a direction of an arrow 62 around a pin 55 of the hinge, as shown in FIG. 6B. The floppy disc which is dropped to the position C of FIG. 6C maintains the guide 52 vertical to cover the slot 54.

Figure 6A:
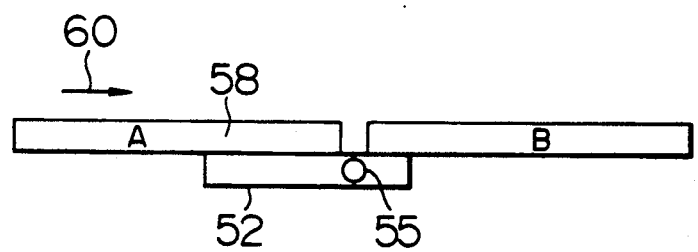
FIGS. 6A, 6B and 6C are respectively side views showing the process of inserting the floppy disc into a slot through the guide.
Figure 6B:
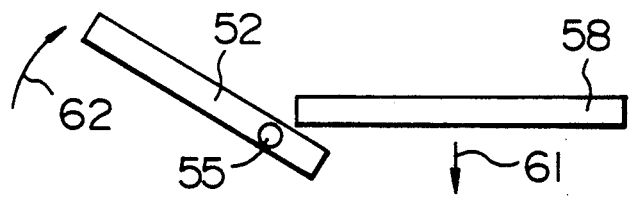
Figure 6C:
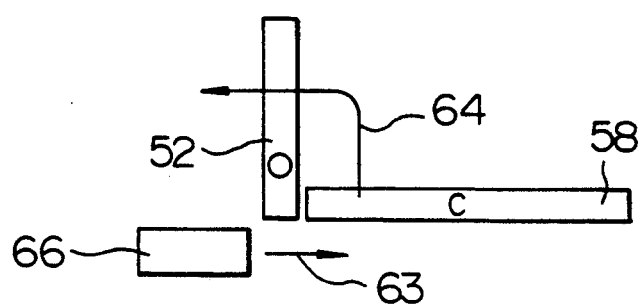

When the eject button used for unloading the disc is pushed in, the floppy disc is pushed upward from the position C by the well known mechanism to return to the state of FIG. 6B and then to the state of FIG. 6A. Thus, the floppy disc is ejected from the apparatus.

A projection 53 is provided so as to substantially correspond in position to the inner vertical edge of the slot 54. The surface of the projection 53 is in parallel with the fron surface of the apparatus and is projected from the left-hand side face of the apparatus.

The operator moves towards rearward the floppy disc horizontally held along the slot face of the apparatus until the floppy is brought into contact with the front side face of the projection 53. Thus, the floppy disc can be loaded in the direction of the arrow 60.

What is claimed is:

1. A disc apparatus comprising:
   a surface having a slot used for inserting therethrough a disc; and
   guide means mounted to said surface so as to be rotatable to a position substantially, perpendicularly intersecting said surface, said guide means having a face on the substantial same level as that of an edge of said slot, said face having dimensions enough to cover said slot.

2. A disc apparatus according to claim 1, wherein said face includes therein a plurality of grooves.

3. A disc apparatus according to claim 1, wherein said face includes there a brush extending longitudinally with respect to said slot.

4. A disc apparatus according to claim 1, further comprising a projection projecting in a direction substantially perpendicular to both one edge of said slot and said surface.

5. A disc apparatus according to claim 1, further comprising hinge means for mounting said guide means to said surface.

6. A disc apparatus according to claim 1, further comprising a magnetic substance and a magnet which are respectively mounted to positions of said guide means and said surface corresponding to each other.

7. A disc apparatus according to claim 1, wherein said guide means is in contact with said surface of said apparatus and has an area larger than that of said slot.

8. A disc apparatus in which a cartridge having a disc mounted therein is inserted through a slot into siad apparatus, said apparatus comprising a guide arranged so as to lie on substantially the same plane as that of a lower member constituting said slot, said guide serving to guide the insertion of said cartridge into said slot and being pivoted to close said slot.

9. A disc apparatus according to claim 8, further comprising a projection projecting in a direction substantially perpendicular to both one edge of said slot and said surface.

10. A disc apparatus according to claim 8, further comprising hinge means for mounting said guide means to said surface.

11. A disc apparatus according to claim 8, further comprising a magnetic substance and a magnet which are respectively mounted to positions of said guide means and said surface corresponding to each other.

12. A disc apparatus according to claim 8, wherein said guide means is in contact with said surface of said apparatus and has an area larger than that of said slot.

* * * * *